United States Patent [19]

Lopez

[11] 4,282,599
[45] Aug. 4, 1981

[54] PHONOGRAPHIC RECORD SPINDLE ADAPTOR

[76] Inventor: Antonio M. Lopez, 420 S. Jordan, Ventura, Calif. 93003

[21] Appl. No.: 108,354

[22] Filed: Dec. 31, 1979

[51] Int. Cl.³ .......................................... G11B 17/04
[52] U.S. Cl. ................................. 369/262; 369/207; 369/270
[58] Field of Search ........................................ 274/105

[56] References Cited

U.S. PATENT DOCUMENTS

| | | | |
|---|---|---|---|
| 2,651,523 | 9/1953 | Dale | 274/105 |
| 3,241,840 | 3/1966 | Freier | 274/105 |

Primary Examiner—Steven L. Stephan
Attorney, Agent, or Firm—Jack C. Munro

[57] ABSTRACT

An adaptor to be employed in conjunction with a phonograph record spindle which is to accommodate a stacked assemblage of phonograph records. The adaptor is to facilitate locating of individual records onto the adaptor, yet also permits easy removal of the entire stacked assemblage of records. The adaptor includes a cylindrical enlarged exterior surface which terminates at its lower end thereof in an annular protruding flange. The bottom record of the stacked records is to rest against this flange. A centrally located opening is formed within the adaptor and is to accommodate the phonograph record spindle. This opening is to have a side wall which is to function to continually depress an outwardly biased elongated blade which is pivotally mounted in conjunction with the spindle. This blade is deemed to be part of conventional phonograph record apparatus and forms no specific part of this invention. The upper end of the adaptor is tapered so as to guide the insertion of the phonograph records upon the adaptor.

4 Claims, 3 Drawing Figures

U.S. Patent     Aug. 4, 1981     4,282,599
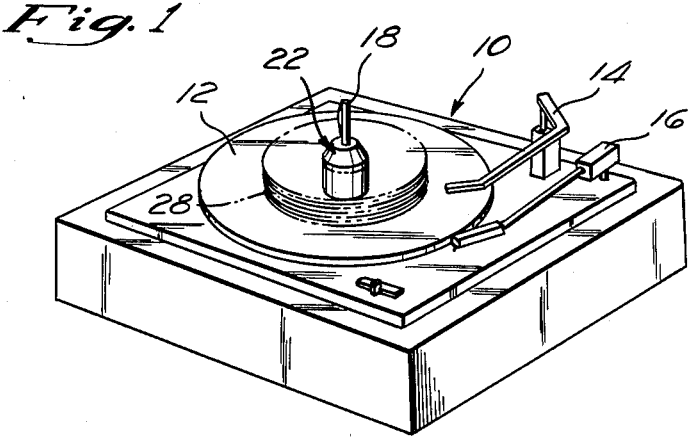
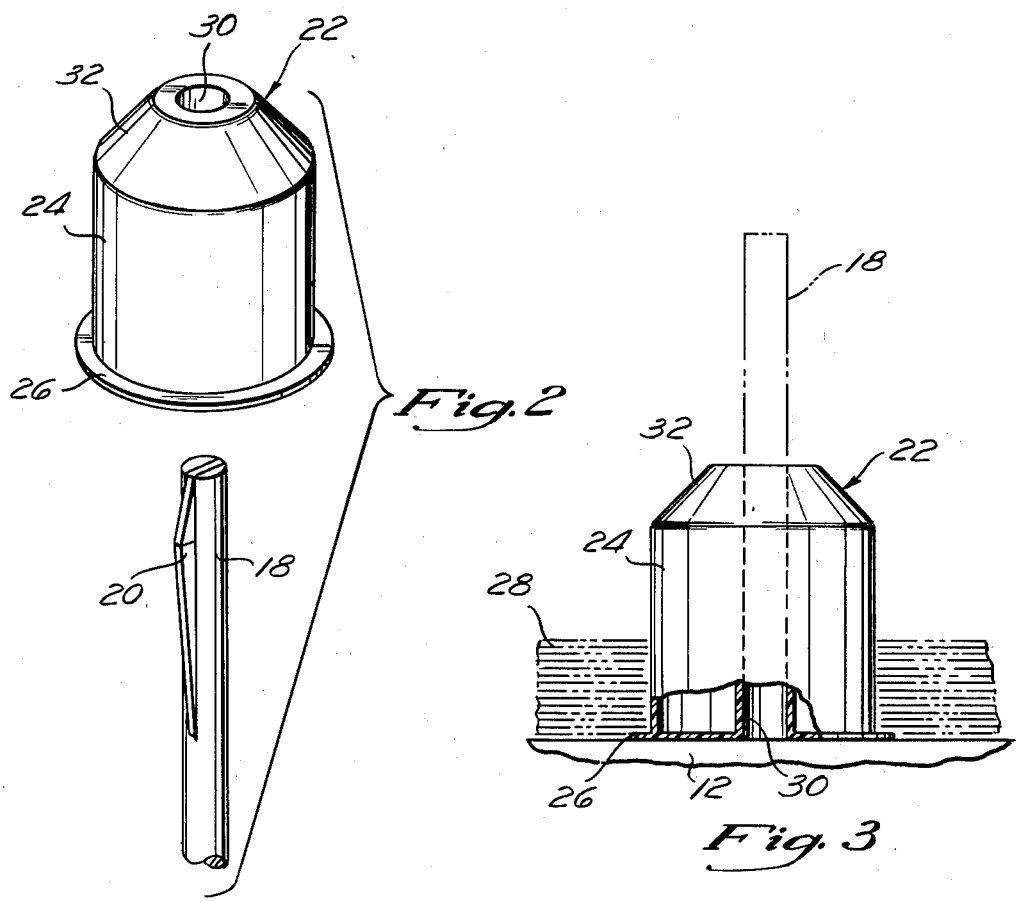

PHONOGRAPHIC RECORD SPINDLE ADAPTOR

BACKGROUND OF THE INVENTION

The earliest phonograph records were designed with small diameter centering holes and were to be employed on phonograph record turntables that rotate at seventy-eight r.p.m. Record players were soon designed to be able to handle a stacked plurality of records to provide continuous playing without interruption. In order to achieve this continuous type of playing operation, a spindle was employed which included the use of a spring biased elongated blade which mechanically caused the records to drop one at a time when desired.

Within recent times, there has been developed a small diameter forty-five r.p.m. record which employs the use of a comparatively large center hole. This type of record cannot be directly employed on the small diameter centering spindle of a conventional type of phonograph record player.

While a limited amount of record players were developed and were restricted for use with the 45 r.p.m. type of record, the greatest popular demand was, and is, for record players with narrow diameter spindles that accommodate the standard 78 r.p.m. records. The 45 r.p.m. records could be played on these record players by employing the use of some form of an adaptor to be mounted on the smaller diameter record changer spindle with the adaptor to accommodate the larger diameter hole in the 45 r.p.m. record.

Previously, such adaptors took different forms. One form employed the use of a wafer that was inserted in the center hole of each of the 45 r.p.m. records. These types of wafers did not experience popular consumer acceptance primarily due to inconvenience and inordinate expense. Additionally, a further deficiency lies in the poor operation of the record changer when using such wafer inserts.

A second form of adaptor took the form of a structure which was mounted directly onto the phonograph spindle. These adaptors have taken numerous forms in the past. One universal deficiency of such prior art adaptors has been the complicating of the construction of the adaptor. The adaptors have been designed to function to drop the 45 r.p.m. records one at a time so that playing of the records can be accomplished continuously. However, after the entire stack of records has been played, it is required to remove the records from the turntable. It has, in the past, been a difficult procedure to so remove the records. Actually, the convenience of removing the records is so great that it is most common to simply eliminate the use of such adaptors.

There is a definite need for an adaptor to be employed in conjunction with the phonograph record centering spindle which would permit the playing of 45 r.p.m. records and would ease the removal of the stacked arrangement of 45 r.p.m. records to facilitate changing of the records or reinsertion of the records for play.

SUMMARY OF THE INVENTION

The structure of this invention is summarily described in the Abstract of the Disclosure and reference is to be had thereto.

The primary objective of this invention is to employ a phonograph record spindle adaptor which facilitates the individual locating of 45 r.p.m. records onto the record player in order that they may be played.

A further objective of this invention is to design a phonograph record player spindle adaptor which facilitates manual removal of a stacked mass of records after playing thereof.

Another objective of this invention is to construct a phonograph record playing adaptor which is constructed of few parts and can be manufactured most inexpensively.

BRIEF DESCRIPTION OF THE DRAWING

FIG. 1 is an isometric view of a phonograph record turntable upon which has been mounted the adaptor of this invention showing in phantom a stacked arrangement of 45 r.p.m. records located about the adaptor;

FIG. 2 is an exploded isometric view showing the adaptor about to be located upon the phonograph record centering spindle; and FIG. 3 is a partially in cross-section, side elevational view of the adaptor of this invention showing in phantom a stacked mass of 45 r.p.m. records located about the adaptor.

DETAILED DESCRIPTION OF THE SHOWN EMBODIMENT

Referring particularly to the drawing, there is shown a conventional phonograph record player 10 which employs a turntable 12, a phonograph record balance arm assembly 14, a movable playing arm assembly 16 and a phonograph record centering spindle 18. The centering spindle 18 includes an elongated blade assembly 20 which is adapted to function in a conventional manner to drop records one at a time into playing position onto the turntable 12. It is to be noted that the diameter of the spindle 18 is such as to only accommodate a small diameter size opening which is usually found in 78 r.p.m. records. There is no way, without some form of modification, to employ the use of the record player 10 to play the 45 r.p.m. type of record. It is to be understood that the foregoing is deemed to be conventional and forms no specific part of this invention.

The adaptor 22 is formed of a sheet material, such as plastic. The adaptor 22 includes a housing 24 which comprises an exterior cylindrical surface. Attached to the lower end of the housing 24 is a thin annular protruding flange 26. The flange 26 is to be located directly into direct contact with the turntable 12 as is shown in FIG. 3 of the drawing. The phonograph records 28 are to be located about the housing 24 and in close conformity therewith. The bottom-most record in the stack of records is to be located directly against annular flange 26. Although the record will not establish an exactly level contact with the turntable 12, this does not deter from the playing of the record.

Extending longitudinally through the housing 24 and centrally located in respect thereto is an opening 30. The opening 30 is of a size to closely conform to the diameter of the spindle 18. The side wall of the opening 30 is to be located parallel to the exterior surface of the housing 24. The portion of the adaptor 22 located between the side wall of the opening 30 and the exterior wall surface of the housing 24 is hollow so as to eliminate mass and thereby decrease manufacturing cost.

The upper end of the housing 24 is inwardly tapered so as to substantially resemble a cone-shaped arrangement. This upper end 32 is for the purpose of guiding the records about the housing 24. Once a record is placed in contact with the upper end 32, the record will automatically align itself to be dropped about the housing 24.

After several records 28 (generally four or six) have been played and the operator decides to change the records or turn them over, the operator only needs to manually grasp the housing 24 adjacent the upper end 32. The operator then removes the entire stack of records since the stack of records rest on the annular flange 26. The operator then makes whatever changing in the records that is desired and then can manually relocate the adaptor 22 onto the spindle 28 with the adaptor 22 generally only supporting a single record.

What is claimed is:

1. In combination with a phonograph having a record centering spindle, said spindle being of a small diameter to accommodate a small diameter center opening within a first type of record, an adaptor to be located on said spindle, said adaptor to be located within the large diameter center opening of a second type of record, a stacked plurality of the second type of records to be located about said adaptor, said adaptor comprising:

an elongated housing having an exterior cylindrical surface terminating in a lower end and an upper end, said lower end including a thin protruding flange which is adapted to be located against the phonograph record turntable and in continuous contact with a said second type of record, said upper end including guide means to guidingly locate said second type of record about said housing; and a centrally located cylindrical opening formed within said housing, said opening being constant in diameter and extending from said upper end to said lower end, said opening to closely conform in size to said spindle, said opening having a side wall, said side wall being parallel to said cylindrical exterior surface of said housing, whereby a stack of records on said adaptor and located on said spindle may be physically removed in mass by physically grabbing said upper end and removing said adaptor and the stack of records from said spindle.

2. The combination as defined in claim 1 wherein:
said protruding flange being annular.

3. The combination as defined in claim 1 wherein:
said guide means comprising a cone-shaped tapering from said exterior cylindrical surface to said centrally located cylindrical opening.

4. The combination as defined in claim 2 wherein:
said guide means comprising a cone-shaped tapering from said exterior cylindrical surface to said centrally located cylindrical opening.

* * * * *